United States Patent [19]

Nutton

[11] Patent Number: 4,868,652
[45] Date of Patent: Sep. 19, 1989

[54] HEAD OF DISPLAY ARRANGEMENTS

[75] Inventor: Martin G. Nutton, Billericay, England

[73] Assignee: Elliott Brothers (London) Limited, Chelmsford, England

[21] Appl. No.: 292,744

[22] Filed: Aug. 14, 1981

[30] Foreign Application Priority Data

Aug. 19, 1980 [GB] United Kingdom ............. 8026603

[51] Int. Cl.⁴ .................... H04N 5/33; G02B 26/10
[52] U.S. Cl. .................. 358/113; 89/41.06; 250/334; 358/109; 350/174; 340/705
[58] Field of Search ............. 89/41 L, 41.06; 250/330, 332, 333, 334, 342; 350/174; 358/109, 113; 340/705

[56] References Cited

U.S. PATENT DOCUMENTS

| | | | |
|---|---|---|---|
| 3,076,961 | 2/1963 | Bibbero | 250/342 |
| 3,581,109 | 5/1971 | Olsson et al. | 358/113 |
| 3,730,985 | 5/1973 | Whitney | 358/113 |
| 3,804,976 | 4/1974 | Gard | 358/113 |
| 3,824,535 | 7/1974 | Rover, Jr. | 350/174 |
| 4,001,499 | 1/1977 | Dowell | 358/109 |
| 4,118,733 | 10/1978 | Sarson et al. | 250/332 |
| 4,225,215 | 9/1980 | Couan | 350/174 |
| 4,262,199 | 4/1981 | Bridges | 250/342 |
| 4,318,047 | 3/1982 | Dawson | 328/112 |
| 4,340,888 | 7/1982 | Seroskie | 358/113 |

Primary Examiner—Stephen C. Buczinski
Attorney, Agent, or Firm—Spencer & Frank

[57] ABSTRACT

In an earlier Specification there is described and claimed a surveillance arrangement suitable for use in an aircraft wherein a television camera/display combination provides an image of the viewed scene, and infrared detector means viewing part of the same scene provides brighten-up signals to effect a localized increase in intensity of the displayed image to highlight heat emitting targets in that part of the viewed scene; the resultant display is ultimately made available to the pilot via a HUD screen. This arrangement is not always satisfactory, and the present invention seeks a better solution by arranging for a target-emphasising visual effect to be generated and projected onto the HUD screen quite separately of the view of the scene, whether that view is obtained directly (through the HUD screen) or indirectly (from an image projected onto the HUD screen). Specifically, it provides a head-up display (HUD) system which includes means (2), preferably a scanning IR detector array, responsive to a radiation characteristic, preferably the IR output, of a target, within a scene viewed in operation on or through the HUD screen, for generating a signal (via 10,18,19) which causes a target-emphasizing visual effect (at 22, preferably a frame around the target position) to be projected onto the HUD screen separately of any scene viewed therethrough or of any image scene projected thereonto.

6 Claims, 2 Drawing Sheets

HEAD OF DISPLAY ARRANGEMENTS

BACKGROUND OF THE INVENTION (1) Field of the Invention

This invention relates to head-up display stytems, and concerns in particular ways of highlighting part of a scene as viewed via a head-up display.

(2) Description of the Prior Art

A head-up display — commonly referred to by the acronym HUD — is a display that can be seen by the observer for whom it is intended while at the same time he has his head up, looking at some other scene. HUDs are most generally provided to give information to drivers of vehicles —and particularly to pilots of aircraft —in such a way that they can look out of their vehicle at the scene in front of it and yet at the same time have displayed in front of them (appearing to be sufficiently far away so that they need not refocus their eyes to see it) such additional information, in pictorial or alphanumeric form, as they may need. This information may, for example, describe the present state of their vehicle and the range to some point of interest. A HUD in an aircraft, for instance, may be arranged to enable the pilot to see in the same place both the outside scene (a target) and vital instrument readings (height, speed, altitude), so relieving him of the necessity of looking down at his cockpit instruments (which are, by contrast, head-down displays, HDDs).

In its simplest form a HUD is little more than a transparent screen placed in front of the observer and through which the observer can see the real world, one surface of this screen forming a reflective interface, the screen being so disposed that this reflective interface may be used to reflect light from some appropriate source towards the observer's eyes along a path such that to the observer this light appears to originate in the real world he is viewing. Because the HUD screen "combines" two optical images, it is generally referred to as an "optical combiner". However, the acronym HUD, and its parent expression (head-up display), are also used to mean rather more than just the optical combiner; the two terms can also include the complex optical and image-forming systems needed to generate the required information and present it, via the optical combiner itself, to the observer. Nevertheless, for the purpose of this specification the two terms are used to denote a display system comprising a transparent screen (the optical combiner) which is in use positioned in front of the intended observer such that the observer can obtain, through the screen, a view of the scene beyond the screen (usually of the terrain outside and in front of the vehicle in which the display system is mounted), and can obtain, reflected off the screen, a view of a second scene which is itself usually a display of pictorial and/or alphanumeric informational matter. The vehicle is most commonly an aircraft, the observer the pilot, and the HUD screen is normally so arranged that the pilot views at least part of the scene towards which the aircraft is flying through the screen (which screen sometimes may be swung down or otherwise moved from a stowed position to an operative position in front of the pilot, or vice versa, as required). For the most part the following description relates to such an aircraft-mounted HUD.

The information displayed on the HUD screen is quite often alphanumeric in form, being numbers or symbols relating to the flight of the aircraft (such as its altitude, its speed, its compass heading and other data required by the pilot). In addition, however, the information may be pictorial, and may in particular be a true pictorial representation of the real world outside the aircraft. For example, at night, by using a low light level television system, there may be generated and displayed via the HUD screen a picture corresponding to the real scene in front of the aircraft, so that the pilot is provided with a picture which is identical to that scene which he would be able to see through the HUD screen were it not dark.

As will be appreciated, HUD systems find particular application in military aircraft, specifically fighter aircraft, and in one aspect the present invention seeks to provide an improved HUD system, especially suited for use in fighter aircraft, in which targets of particular interest are more readily distinguished.

In U.S. Pat. No. 4,118,733 there is described a surveillance arrangement suitable for use in an aircraft wherein a television camera/display combination provides an image of the viewed scene, and infra-red detector means viewing part of the same scene provides brighten-up signals to effect a localised increase in intensity of the displayed image to highlight heat emitting targets in that part of the viewed scene. In one described embodiment, the output of the infra-red detection means is mixed with the camera signals so that the former acts to brighten up areas of the displayed image generated by the latter which correspond to the positions of heat-emitting targets, and in a development of that embodiment the resultant display is ultimately made available to the pilot via a HUD screen. In this earlier invention the brightened up areas may constitute either a true image of the target or a symbolic representation, or cue, of the existence of the target at that position.

There are, however, a number of occasions when the arrangement of the earlier invention is not satisfactory. Thus, for example, it is sometimes convenient for the visual representation of flight information and target data to be generated not by a television-type display but instead by a source—such as a diode matrix—capable of emitting light of a much higher intensity, so that it may be the more clearly visible under daylight viewing conditions. Additionally, it may well be that there is no need, say, for the pilot to fly his aircraft by sight-based upon a television-type display of the real world (as generated by, for instance, a low light level system or an infra-red system), but that target information is still required. In either case it is clearly not possible for target highlighting signals to be mixed with scene-viewing camera signals.

The present invention seeks to deal with this problem by arranging for a target-emphasising visual effect to be generated and projected onto the HUD screen quite separately of the view of the scene, whether that view is obtained directly (through the HUD screen) or indirectly (from an image projected onto the HUD screen).

BRIEF SUMMARY OF THE INVENTIVE CONCEPT

In one aspect, therefore, this invention provides a head-up display (HUD) system as described hereinbefore which comprises in addition means, responsive to a radiation characteristic of a target within a scene viewed in operation on or through the HUD screen, for generating a signal which causes a target-emphasising visual effect to be projected onto the HUD screen separately of any image scene projected thereonto.

DETAILED DESCRIPTION OF THE INVENTIVE CONCEPT

The scene is viewed by the operator either directly (through the HUD screen) or indirectly (as an image generated by a television system and projected onto the HUD screen). In the latter case the television system may employ a television display screen in association with either a visible light television camera (for example, a low light level visible light television camera) or an infra-red television camera arrangement (in which a television camera is utilised which employs infra-red detectors arranged to view the scene; these detectors may be in a matrix or array—and may, indeed, be the same array as is described hereinafter with reference to the means responsive to the target radiation characteristic).

The visual effect is preferably a cue marker positioned so as to indicate the target. While the marker may be a spot—or, indeed, an arrow or a line — projected onto the HUD screen so as to appear to be in or adjacent the target position, advantageously it is a frame around the target position. The frame may be any convenient shape and size—for example, rectangular or circular, large or small.

The radiation characteristic to which the signal generating means is responsive is desirably the infra-red signature of the target. In such a case the signal generating means is responsive to the IR radiation output by the viewed scene; it conveniently includes an infra-red sensor unit comprising a linear array of infra-red detectors arranged to be repeatedly scanned across the scene, each detector in the array being connected both to means for determining if the width in the azimuth direction of an impulse in the detector output corresponds to that of a desired target and if its amplitude corresponds to that of the likely temperature (relative to its surroundings) of a desired target and to means for comparing the outputs of adjacent detectors in the array to determine if the height in elevation of a detected target corresponds to that of a desired target, whereby the detection of a desired target which is to be emphasised is determined.

Very preferably there is also provided means for storing signals corresponding to the desired targets in a store at locations corresponding to the position of determined desired targets in the scene, and means for utilising these stored signals for generating the required visual-effect-causing signals.

The system may also conveniently include a television camera and head-down display system including a visual effect generator (controlled by the store), whereby the television display unit of the television system arranged to provide a head-down display also displays the visual effects. This television system may advantageously comprise either a visible light television system (for example, a low light level visible light television system), or it may comprise an infra-red television system.

As is usual with HUD systems, the HUD screen is commonly a separate screen that can be placed in front of the observer. However, it may be incorporated in the helmet of the observer (for example, it may be part of a visor of the helmet) or it may be formed by a window or windscreen of the vehicle.

In order to mitigate any problems of parallax, alignment or sighting marks may be provided on both the HUD screen and the vehicle window through which the scene is viewed so that the observer may adjust his position correctly with respect to the HUD screen. However, a number of other measures may be applied separately or in addition to deal with any parallax problems. For example, sensing means may be provided within the "cockpit area" reserved for the observer, which means is responsive to the positions and movements of a helmet worn by the observer so as to generate steering signals which are then utilised to cause the visual effect to move appropriately and in compensating manner on the HUD screen.

The invention extends, of course, to a vehicle, especially a fighter aircraft, wherever employing a head-up display system as described and claimed herein.

BRIEF DESCRIPTION OF THE DRAWINGS

The invention is illustrated in and further described with reference to the accompanying drawings, in which.

DETAILED DESCRIPTION OF THE DRAWINGS

Figure 1:
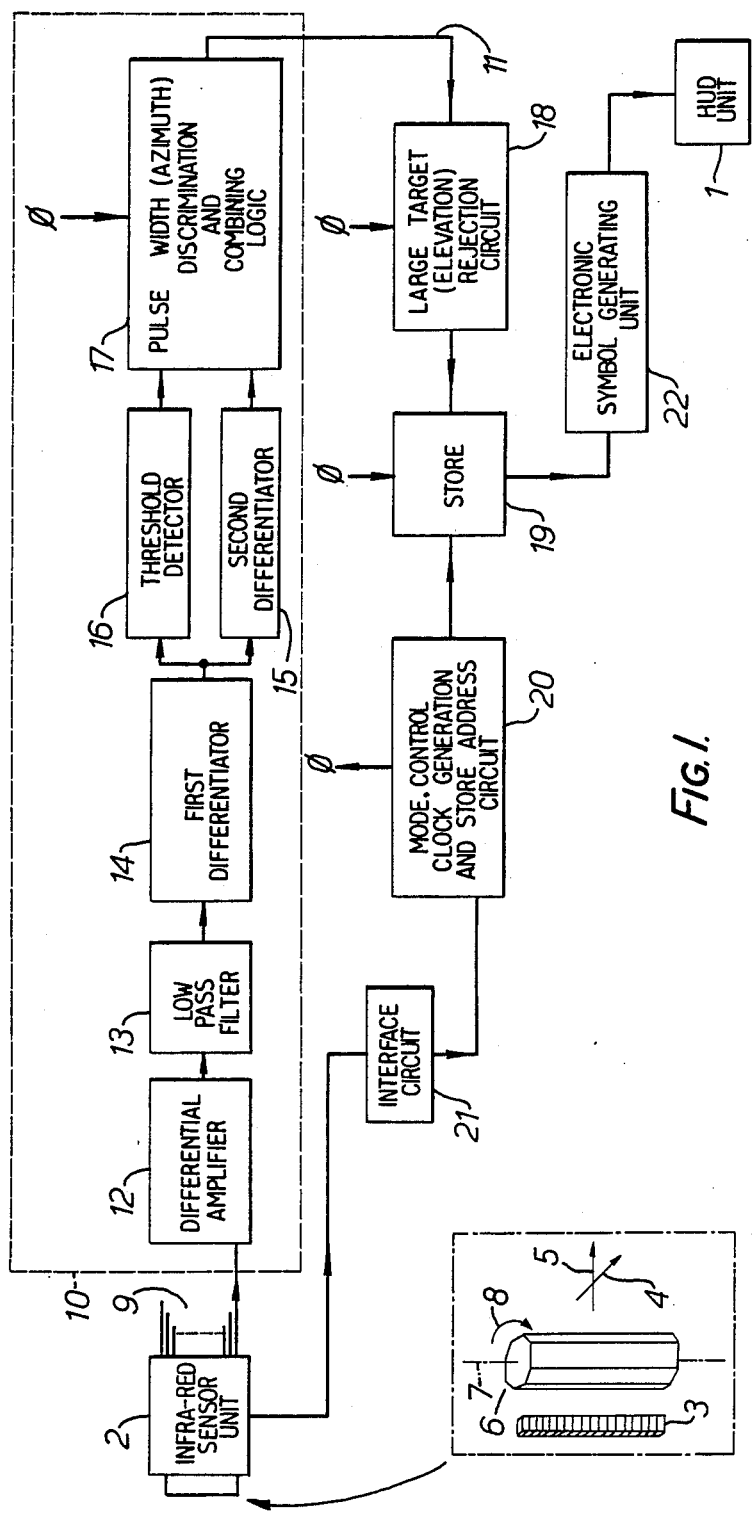
FIG. 1 is a block schematic diagram of one HUD system in accordance with the present invention.

The HUD system of FIG. 1 comprises overall a HUD display unit (1) receiving input data from an IR sensor unit (2) via various electronic circuitry explained further below. For the purposes of this discussion it is assumed that the system is in an aircraft, and that the observer using the system is the pilot.

The HUD unit 1 is known per se. It consists of—not shown separately—a screen (through which the pilot obtains a view forward) and an optical image generator and projector arranged to cause images providing information for the pilot to be displayed on the HUD screen within his normal vision.

The view obtained by the pilot through the screen of HUD unit 1 will be similar to that which he obtains looking through the forward facing windscreen of his aircraft.

The infra-red sensor unit 2 is mounted to have the same forward view as is obtained by the pilot through the HUD screen. This IR sensor unit 2 is shown in more detail in the inset to FIG. 1. It includes a vertical linear array (3) of infra-red detectors (in a practical case, 30 in number) which are arranged to be scanned together in a swathe across the viewed scene in a direction (indicated by arrow 4) transverse to the flight path of the aircraft (indicated by arrow 5). The scanning process is here shown being effected by means of a rotative reflective polygon (6), as known per se, rotatable about its vertical axis (7) in the direction of the arrow (8).

Each infra-red detector in the array 3 is connected to an individual output channel (collectively represented at 9), and each one of the channels 9 is connected to an individual processing circuit (one such is shown at 10) which provides at its output (11) a signal in response to a heat emitting target viewed by the respective infra-red detector during scanning if in azimuth the thermal signature—that is to say its intensity and length in an azimuth direction—corresponds to that of a known desired target (such as a tank). Processing circuit 10, in this example, essentially comprises a sequence of the following integers: a differential amplifier (12) to which the positive and negative terminals of the respective infrared detector are connected; a noise-reducing low pass filter 13, which removes high frequency noise in the signals; a first differentiating circuit (14), which provides a high pass filtering effect tending to attenuate frequency components from extended targets; a second differentiating circuit (15), which produces a doubly-differentiated waveform such that the width of each pulse corresponding to a heat emitting target may readily be measured with reference to the zero crossing points in the doubly-differentiated signal corresponding to the start and finish of each pulse; in parallel with the second differentiating circuit 15, a threshold detector (16), which produces at its output logic signals corresponding only to those pulses in the output of differentiating circuit 14 which are above a certain threshold established in dependence upon the differential temperature level of a desired target; taking the outputs of both the threshold detector 16 and the second differentiating circuit 15, an azimuthal pulse width differentiating and combining logic circuit (17), which effectively removes those logic signals in the output of the threshold detector 16 which, by measurement of the pulse lengths using the zero crossing points in the doubly-differentiated signal provided by second differentiating circuit 15, are determined not to originate from a desired target because of their lengths.

Processing circuit 10 is described and claimed in U.S. patent application Ser. No. 35,402, now U.S. Pat. No. 4,318,047, issued March 2, 1982, and reference may be made to that patent if any more detailed description of the operation of the processing circuit is required.

Whilst the system above descibed uses a separate processing circuit 10 in respect of each detector element in the array 3, in other embodiments of the invention a single processing circuit corresponding to 10 is provided which is shared by all of the detector elements by a multiplexing technique.

The output of processing circuit 10 (i.e. the output of logic circuit 17) is applied to a large target (elevation) rejection circuit (18). This rejection circuit derives inputs from the processing circuits 10 provided for the two infra-red sensors on either side of the instant detector in the array 3, correlates the outputs of these, and, by comparing pulses of similar azimuthal position, rejects those which occur in the waveforms originating from more than a given number of adjacent sensors in the array 3. Thus, targets which are large in elevation—such as factory chimneys, trees etc. —are rejected.

The output of rejection circuit 18 is applied to the input of a store (19) to which are also applied the corresponding outputs of all of the other large target (elevation) rejection circuits such as 18 provided in respect of the other detectors in the array 3. The reading-in to the store 19 of the waveforms applied to its various inputs is under the control of a mode control, clock generation and store address circuit (20) which is synchronised, via an interface circuit (21), to the rotation of the reflective polygon 6 (or, in other words, to the azimuth scanning of the array of detectors 3). Circuit 20 supplies system clock timing signals to logic circuit 17, rejection circuit 18 and store 19, as required, as represented by the leads marked φ. Thus, in store 19 there is built up a pattern of signals stored at addresses corresponding to positions in the scene being viewed by the infra-red sensor unit 2 at which heat emitting targets exist the characteristics of which correspond to those of targets of interest such as, for example, fighting tanks.

An output from the store 19 is connected to an electronic symbol generating unit (22) associated with the HUD unit 1. This symbol unit 22 generates, in positions indicated by the store 19, symbols in the form of rectangular frames which are displayed by the HUD unit 1 in positions on its screen so as to frame the heat centre of a likely target.

As the aircraft proceeds along its flight path so store 19 is updated with fresh swathes derived from the scanning of the array 3 across the flight path of the aircraft.

Figure 2:
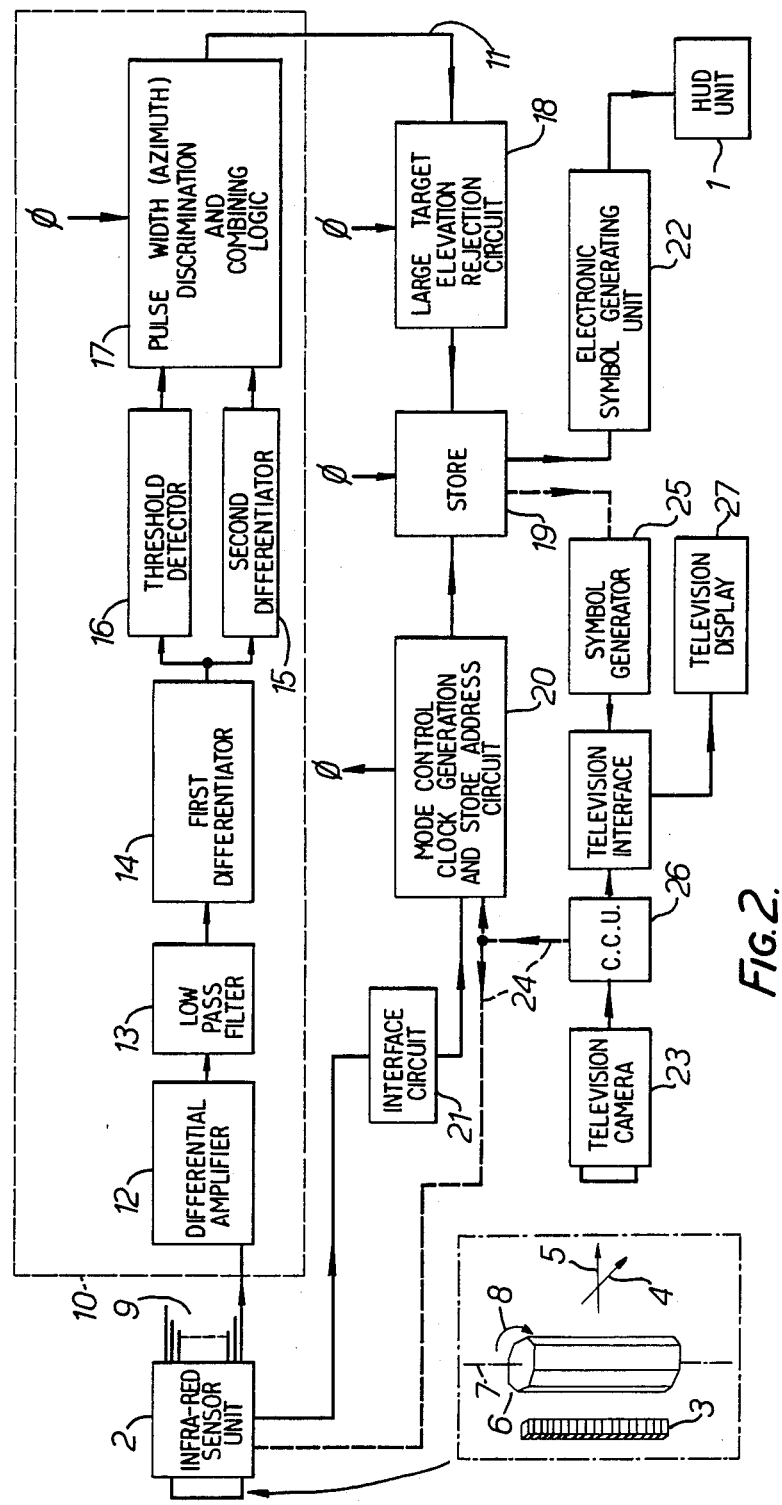
FIG. 2 is a block schematic diagram of a development of FIG. 1.

The development illustrated in FIG. 2 is generally similar to that of FIG. 1. What is added is a television type display—what is commonly called a "head-down display", so named because it is below the normal line of vision of the pilot (i.e., the television display is mounted in an instrument panel of the aircraft). The additional features associated with this HDD comprise a low light level television camera (23) which is synchronised with the infra-red sensor unit 2 and the mode control, clock generation and store address circuit 20, as represented by the dashed lines (24). A symbol generator (25) is controlled by the store 19, in a manner similar to that in which the store 19 controls electronic unit 22, to produce symbols in the form of rectangular frames which, by way of a television interface circuit (26), are superimposed upon the television display formed on the television display unit (27). Thus, not only does the pilot have targets emphasised for him in his HUD screen but also a similar effect is achieved in his head down display for reference under conditions of poor visibility. If desired of course the television display 26 (or additional television display units) may be located remote from the pilot for observation by other crew members if the aircraft is not a single seater.

As described, the television camera 23 is a conventional low light level visible light camera. In other embodiments of the invention, however, the television camera 23 is an infra-red television camera comprised of a matrix of infra-red detectors, so that the picture displayed on television display unit 27 is in fact a heat picture of the scene being viewed.

In yet other embodiments, the television display unit 27, be the television camera 23 a visible light or infra-red camera, is arranged itself to provide an image for display on the HUD screen, so that at night the pilot obtains what appears to be a view of the scene he would see through his HUD screen if it were not for darkness.

The invention as so far described may be modified in a number of ways without changing its essential character. For example:

The above description assumes that the temperature of a desired target will be relatively high. However the invention may equally be applied where the temperatures of targets of interest are low relative to their surroundings.

It will be appreciated that in determining the desirability of a target by its infra-red signature, other criteria may be applied beyond relative temperature, width and height. The target response may be subjected to further computer analysis aimed at further discriminating against unwanted targets.

In order to mitigate any problems of parallax occasioned by the different statures of pilots, and hence the different relative positions of their heads, and by the fact that a pilot's head is not fixed in position relative to the HUD screen and the scene being viewed, a number of measures may be adopted. The simplest of these is to provide alignment or sighting marks on both the HUD screen and the aircraft windscreen so that a pilot may adjust his position correctly at the beginning of a run towards likely targets. In order to avoid the necessity for the pilot to have to consider such matters, however, sensing means may be provided within the cockpit responsive to the position and movements of the pilot's helmet to generate steering signals capable of controlling electronic symbol generating unit 22 to move the images projected on to the HUD screen appropriately and in compensating manner.

I claim:

1. A head-up display (HUD) system which includes: a HUD screen; first means, responsive to a radiation characteristic of a target within a scene viewed in operation on or through the HUD screen, for generating a signal indicative of the presence in the viewed scene of a target; and second means, responsive to said signal generated by said first means, for generating a target-emphasising visual effect and for causing said effect to be projected onto said HUD screen separately of any image scene projected thereonto, and adjacent the position of the associated target in the viewed scene.

2. A HUD system as claimed in claim 1, wherein the scene is viewed by the operator indirectly as an image generated by a television system and projected onto the HUD screen, and the television system employs a television display screen in association with either a visible light television camera or an infra-red television camera arrangement.

3. A HUD system as claimed in any of the preceding claims, wherein the visual effect is a cue marker in the form of a rectangular or circular frame around the target position.

4. A HUD system as claimed in claim 1, wherein the radiation characteristic to which the signal generating said first means is responsive is the infra-red signature of the target, and the signal generating said first means is responsive to the IR radiation output by the viewed scene and includes an infra-red sensor unit comprising a linear array of infra-red detectors arranged to be repeatedly scanned across the scene, each detector in the array being connected both to means for determining if the width in the azimuth direction of an impulse in the detector output corresponds to that of a desired target and if its amplitude corresponds to that of the likely temperature (relative to its surroundings) of a desired target and to means for comparing the outputs of adjacent detectors in the array to determine if the height in elevation of a detected target corresponds to that of a desired target, whereby the detection of a desired target which is to be emphasised is determined.

5. A HUD system as claimed in claim 4, wherein there is also provided means for storing signals corresponding to the desired targets in a store at locations corresponding to the position of determined desired targets in the scene, and said second means includes means for utilising these stored signals for generating the required visual-effect-causing signals.

6. A HUD system as claimed in claim 1, wherein the HUD screen is a separate screen placed in front of the observer, and, in order to mitigate any problems of parallax, alignment or sighting marks are provided on both the HUD screen and the vehicle window through which the scene is viewed so that the observer may adjust his position correctly with respect to the HUD screen.

* * * * *